Patented Mar. 10, 1931

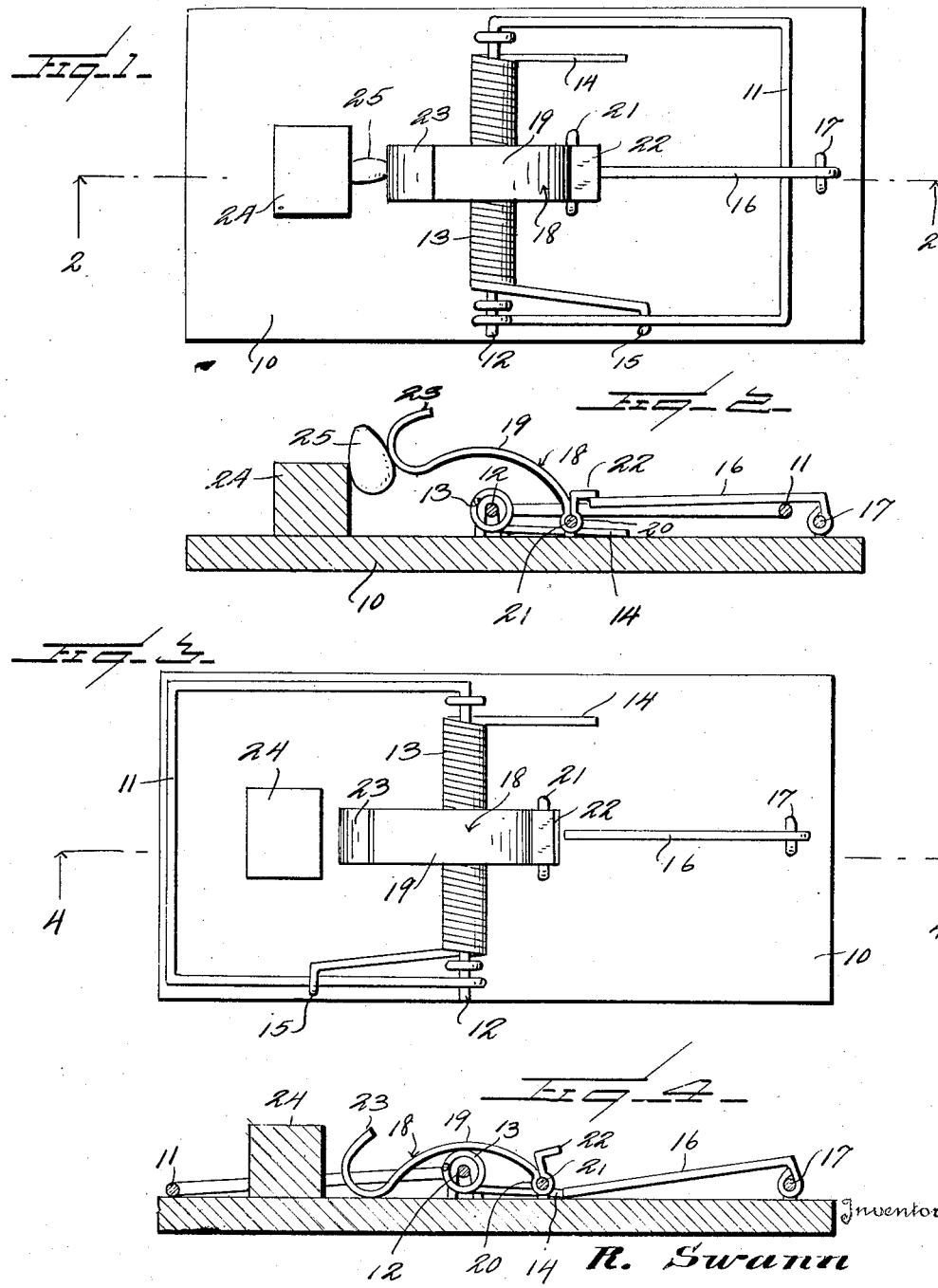

1,795,806

UNITED STATES PATENT OFFICE

ROBERT SWANN, OF MURRAY, KENTUCKY

BAIT-SET TRAP

Application filed April 1, 1930. Serial No. 440,773.

This invention relates to traps and more particularly to a bait set trap.

An object of this invention is to provide a trap wherein the bait holds the trap in set position and when the bait has been removed, the trap will close.

Another object of this invention is to provide a trap which is particularly adapted for catching rodents or small animals and which is adapted to kill the animals when caught in the trap.

A further object of this invention is to provide a trap of simple construction which may be very cheaply manufactured so as to permit the marketing of the article at a relatively small cost.

The above and various other objects and advantages of this invention will in part be described in and in part be understood from the following detailed description of the present preferred embodiment, the same being illustrated in the accompanying drawing wherein:—

Figure 1 is a detail top plan view of a device constructed according to the preferred embodiment of this invention showing the trap in set position;

Figure 2 is a longitudinal sectional view taken on the line 2—2 of Figure 1;

Figure 3 is a detail top plan view of the device in unset position; and

Figure 4 is a longitudinal sectional view taken on the line 4—4 of Figure 3.

Referring to the drawing wherein like numerals of reference designate corresponding parts throughout the several views the numeral 10 designates a base for the trap which is of any desired configuration, and the numeral 11 designates a looped animal engaging member which is pivotally secured to the base 10 by means of a pintle or pivotal member 12.

A spring or tensioning member 13 is positioned about the pintle 12 and engages at one end against the base 10 as at 14 and the opposite end extends longitudinally of the member 11 and is provided with a looped portion 15 which is looped about the member 11 so that when the member 11 is swung rearwardly on the base, the spring 13 will be placed under tension and when released will swing forwardly against the base.

If desired, the pintle 12 may be formed integrally with the looped member 11 and be secured to the base 10 by means of staples or the like.

A securing member 16 is swingingly secured at one end to the base as at 17, the opposite end of the securing member 16 being free, and is adapted to contact with the looped member 11 when the looped member is swung rearwardly against the tension of the spring 13. The free end of the securing member 16 is adapted to contact with a pivoted trigger generally designated as 18.

The trigger 18 comprises a strap which is curved as at 19 so as to extend about the spring 13 and is provided with a looped portion 20 for engagement with a pivotal member 21 mounted on the base 10, and the rear end of the strap 19 is extended substantially horizontally as at 22 and is adapted to contact with the free end of the securing member 16.

The forward end of the trigger 18 is curved or looped as at 23, and an upstanding post 24 is secured to the base 10 at a point spaced rearwardly from the forward end thereof and intermediate the forward end of the base and the spring 13. The rear edge of the post 24 is adapted to be positioned spaced forwardly of the forward end of the trigger 18 and when a bait or the like 25 is positioned against the inner edge of the post 24, the looped end 23 is adapted to contact with the bait, the bait holding the trigger 18 in set position so that when the bait 25 is disturbed or removed from between the post and the forward end of the trigger, the forward end of the trigger is adapted to swing downwardly thereby releasing the securing bar 16 and permitting the tensioned member 11 to swing forwardly so as to catch the animal upon the base 10.

In the operation of this device, the looped member 11 is adapted to be swung rearwardly on the pivot or pintle 12 against the tension of the spring 13, and the securing bar 16 is adapted to contact with the looped member 11 so as to hold it in set position, the forward end of the securing bar 16 engaging against the rear end 22 of the trigger 18 and tensioning the trigger 18 against the bait 25 which is interposed between the post 24 and the curved forward end 23 of the trigger.

It will be obvious from the foregoing that the spring 13 not only tensions the animal engaging member 11 but also tensions the trigger 18 upon the bait 25 so that the bait will not be accidentally removed therefrom, and the bait 25 cannot under any circumstances be removed from between the post 24 and the curved end 23 without unsetting the trap.

It will, of course, be understood that various changes and modifications may be made in the details of construction and design of the above specifically described embodiment of this invention without departing from the spirit thereof, such changes and modifications being restricted only by the scope of the following claims.

What is claimed is:—

1. A bait set trap of the character described comprising a base, a looped animal engaging member pivotally mounted on the base, tensioning means for said animal engaging member, a trigger swingingly mounted on the base, a securing bar pivotally mounted on the base and adapted to engage said trigger whereby to hold said animal engaging member in set position, a post upstanding from the base and positioned forwardly of said trigger and in spaced relation thereto, said post and said trigger being adapted to receive therebetween a bait member, said post and trigger holding the bait in spaced relation to said base.

2. A bait set trap of the character described comprising a base, an animal engaging member pivotally mounted on the base, tensioning means for said animal engaging member, a trigger swingingly mounted on the base, said trigger having a looped forward end portion, a post upstanding from the base and positioned forwardly of said trigger, means for holding said animal engaging member in set position, said holding means engaging said trigger at the rear end thereof, said tensioning means being adapted to tension said trigger and said holding means and cooperatively tensioning a bait element interposed between the looped forward end of said trigger and said post, said bait element when interposed between said trigger and post being disposed in spaced relation to the base.

In testimony whereof I hereunto affix my signature.

ROBERT SWANN.